Oct. 17, 1961  W. B. CART  3,005,120
PHASE SHIFTING DEVICE FOR SYNCHRONOUS DYNAMOELECTRIC MACHINES
Filed Oct. 5, 1959
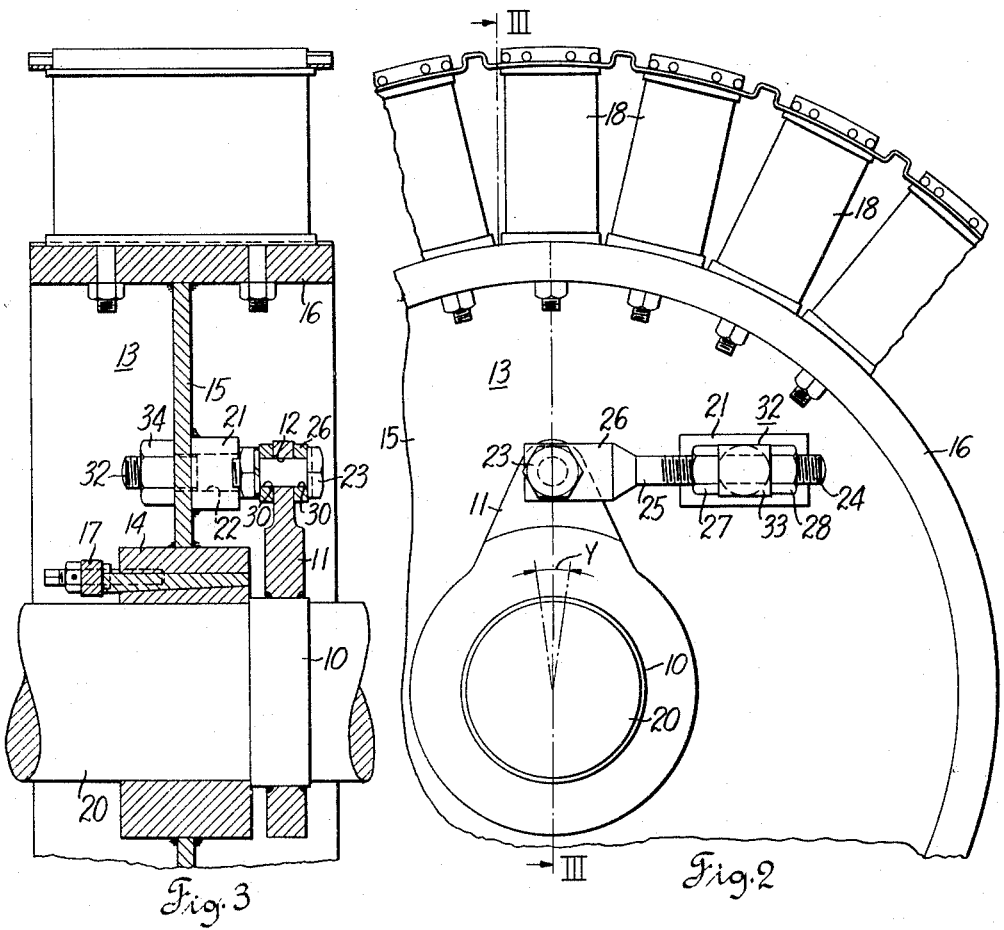
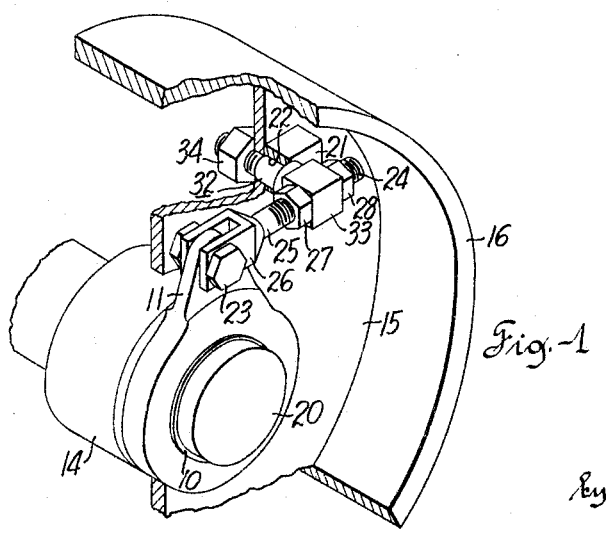
Inventor
Ward B. Cart
By Fabian A. Brush
Attorney

United States Patent Office 3,005,120
Patented Oct. 17, 1961

3,005,120
PHASE SHIFTING DEVICE FOR SYNCHRONOUS DYNAMOELECTRIC MACHINES
Ward B. Cart, Milwaukee, Wis., assignor to Allis-Chalmers Manufacturing Company, Milwaukee, Wis.
Filed Oct. 5, 1959, Ser. No. 844,228
2 Claims. (Cl. 310—209)

This invention relates to synchronous dynamoelectric machines. More particularly, this invention relates to paralleling a plurality of synchronous machines coupled to a single power transmission element. In utilizing a plurality of synchronous dynamoelectric machines that are coupled to a single power transmitting or receiving element requires having the synchronous machines operate in parallel. The reason is that the rotors of all synchronous dynamoelectric machines must bear the same phase relationship between the rotor and the stator to operate in parallel. However, it is difficult to achieve this relationship with sufficient accuracy during manufacture to insure this condition.

In the past, synchronous machines were paralleled by shifting the stator. Paralleling synchronous machines by shifting the stator is both costly and time consuming. It is necessary that the stator have a special rotatable stator cradle frame and which in turn requires a special cradle, a special bed plate, and an oversize housing to enclose the stator cradle frame. The result of these special items increases the overall size of the machine, and though paralleling becomes possible, it remains difficult.

According to the present invention, it is proposed that paralleling a plurality of synchronous machines be accomplished by adjusting the angular position of the rotor without rotating the shaft. This will eliminate the need for any special stator frame support and provide a synchronous motor wherein the stator would be standard in every respect. The major rotor parts would also be standard except for a relatively small number of simple and inexpensive items which would be added to a standard rotor.

It is an object of this invention to provide a new and improved synchronous machine that can be paralleled mechanically with a minimum of structural alteration.

Another object of this invention is to provide a new and improved synchronous machine wherein the paralleling or shifting is done near the axis of the machine.

Another object of this invention is to provide a new and improved synchronous machine having improved torque transmitting means between the spider and the shaft.

How these and other objects are obtained will become apparent from the following description when read in conjunction with the accompanying drawings, and in which:

FIG. 1 is a partial isometric view of the present invention;

FIG. 2 is a partial side view of a rotor embodying the invention; and

FIG. 3 is a view of FIG. 2 taken along the line III—III.

Referring to the drawings, a collar 10 having an arm 11 is mounted on the shaft 20 as by welding, for rotation therewith. The arm 11 is provided with an aperture 12 extending therethrough parallel to the shaft axis.

The rotor 13 comprises a hub 14, a spider 15 and a coil mounting plate 16 having coils 18 mounted thereon. The hub 14 having a slip clearance fit on shaft 20 is mounted thereto for rotation therewith by means of a split tapered expansion or wedging key 17. This arrangement is provided to eliminate radial play between the hub 14 and the shaft 20 during the motor operation. Therefore, the wedging key 17 securely mounts the hub 15 to the shaft 20, but does not act as the sole transmitting medium between the shaft and the rotor.

A mounting block 21 is mounted to the spider 15, as by welding. An aperture 22 is provided in mounting block 21 parallel to the shaft axis and extends through mounting block 21 and spider 15. An eyebolt 32, having slip clearance fit, is inserted in aperture 22 of mounting block and spider 15, being removably mounted thereto by means of eyebolt nut 34.

An adjusting rod 25 is provided with a clevis 26 at one end and a threaded portion 24 at the other end. Threaded portion 24 is received by eye 33 of eyebolt 32, and nuts 27 and 28 are provided as adjusting means for rod 25 relative to eyebolt 32. Clevis 26 is provided with apertures 30 for receiving a bolt 23, connecting the arm 11 to the driving rod 25.

In operation, Y represents the maximum angle through which the camlike offset 11 would have to be shifted in adjusting the rotor 13 for paralleling the motor. The wedging key means 17 would be loosened to permit the spider hub 14 to turn in its slip clearance fit on the shaft 20. Eyebolt nut 34 would be loosened to permit the eyebolt 32 to turn in its slip clearance fit in mounting block 21 and spider 15. The spider 15 would then be rotated as required on shaft 20 within the angle Y by turning the adjusting nuts 27 and 28 positioned on either side of the eye 33 of eyebolt 32. After the proper setting has been attained, the rotor 13 would be secured to the shaft 20 by reversing the loosening procedure.

This adjusting mechanism has two functions: (1) to adjust the angular position of the spider on the shaft, and (2) to transmit the driving torque between the spider and the shaft.

While but a single embodiment of the invention has been illustrated, it will be understood that modifications and equivalents such as readily occur to those skilled in the art are included within the scope of this invention which is intended to be limited only by the scope of the claims appended hereto.

Having now particularly described and ascertained the nature of my said invention and the manner in which it is to be performed, I declare that what I claim is:

1. An adjusting device for paralleling synchronous dynamoelectric machines comprising: a shaft; a rotor having slip clearance on said shaft; means for locking said rotor on said shaft to prevent radial play between said rotor and said shaft and releasing said rotor from said shaft; and means to adjust the angular position of said rotor on said shaft, said means transmitting the driving torque of the motor from said rotor to said shaft.

2. An adjusting device for paralleling synchronous dynamoelectric machines comprising: a shaft having an arm mounted thereon for rotation therewith; a rotor having a hub and a spider; said hub having slip clearance on said shaft and positioned adjacent said arm; means locking said hub to said shaft to prevent radial play between said rotor and said shaft; a mounting block attached to said spider; a rod transmitting driving torque between said rotor and said shaft, said rod having a clevis at one end and a threaded portion at the other end, said clevis being removably attached to said arm and said threaded portion being adjustably mounted to said mounting block by suitable means to adjust the angular position of said rotor on said shaft.

References Cited in the file of this patent
UNITED STATES PATENTS

| | | |
|---|---|---|
| 981,881 | Rhodes | Jan. 17, 1911 |
| 2,453,523 | McCullough | Nov. 9, 1948 |